(No Model.) 2 Sheets—Sheet 1.
T. D. COOK.
WINDMILL.
No. 517,542. Patented Apr. 3, 1894.
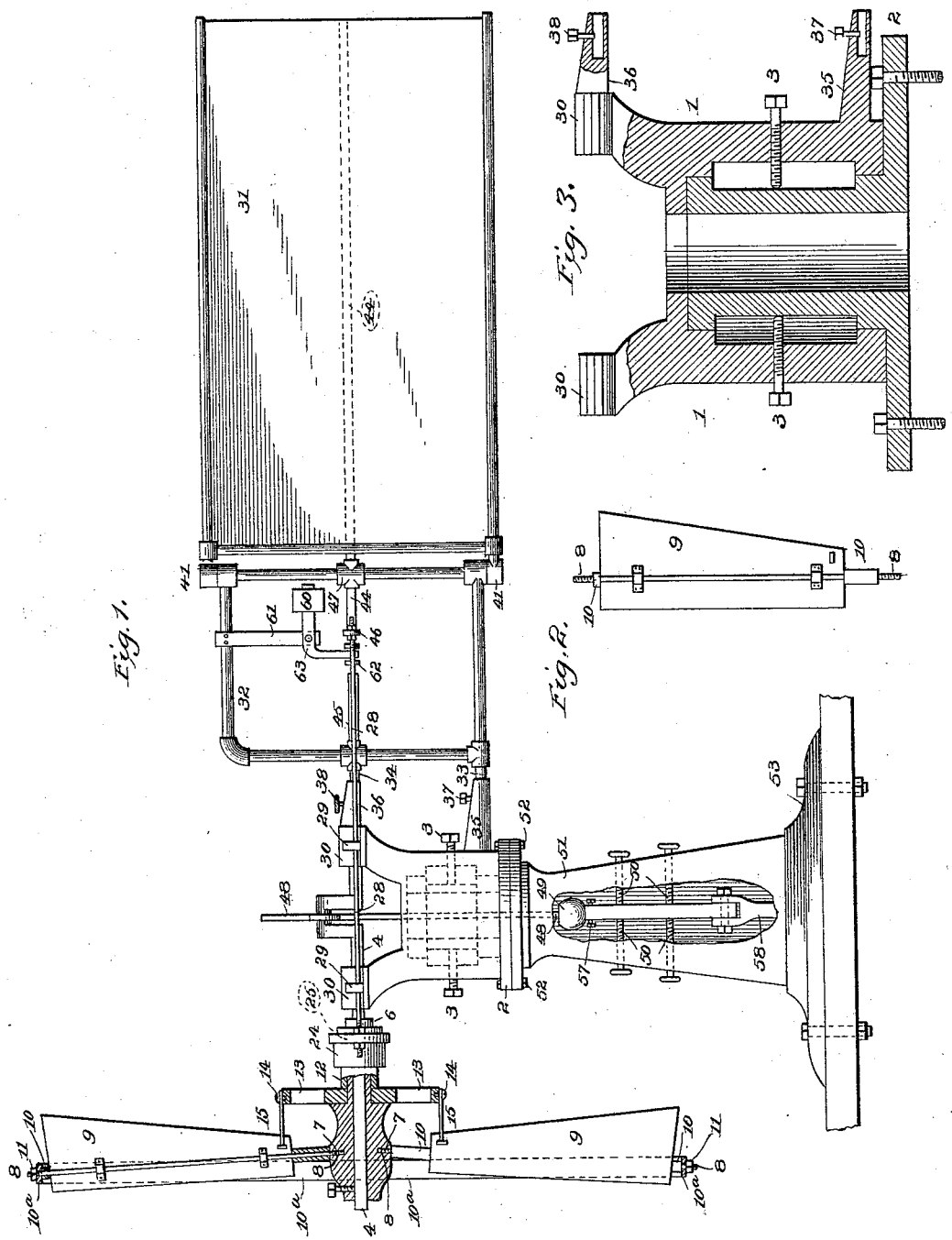
Witnesses:
Harry T. Rohrer
Geo. E. Cruse
Inventor:
Truman D. Cook
By Knight Bros.
Attys.

(No Model.)
2 Sheets—Sheet 2.
T. D. COOK.
WINDMILL.
No. 517,542.  Patented Apr. 3, 1894.
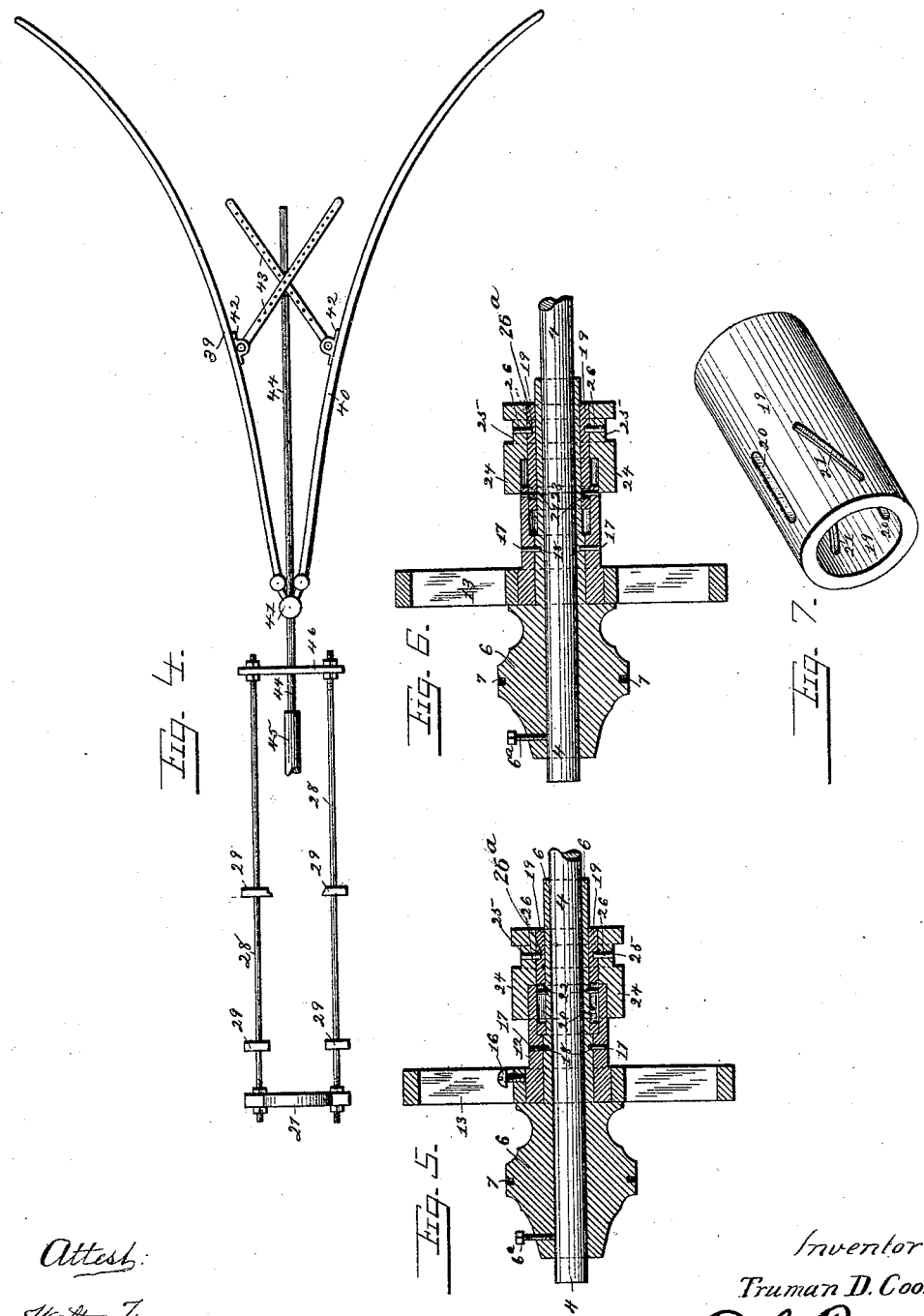
Attest:
Walter Tumaniss
Geo. L. Cruse
Inventor:
Truman D. Cook.
By T. S. Brown
Attorney

UNITED STATES PATENT OFFICE.

TRUMAN D. COOK, OF TOPEKA, KANSAS.

WINDMILL.

SPECIFICATION forming part of Letters Patent No. 517,542, dated April 3, 1894.

Application filed July 23, 1892. Serial No. 441,018. (No model.)

*To all whom it may concern:*

Be it known that I, TRUMAN D. COOK, a citizen of the United States, residing at Topeka, in the county of Shawnee and State of Kansas, have invented certain new and useful Improvements in Windmills, of which the following is a specification.

My invention relates to improvements in wind-mills which are provided with a self-regulating governing mechanism; and the objects of my invention are first to provide a cheap, simple and effective governing mechanism; second, to provide a direct connection between the governing mechanism and the operative parts of the wind wheel; third, to provide a vane susceptible to the slightest variation in the velocity or direction of the wind without jar or lurch; fourth, to provide a vane governor, simple, cheap and effective in operation. I secure these objects by means of the mechanism shown in the accompanying drawings, in which—

Figure 1 is a vertical projection of my windmill with a part of the column removed showing the connection with the pump piston or working shaft. Fig. 2 shows one of the wings of my wind wheel and arm carrying the same. Fig. 3 shows a vertical cross-section of the turn-table and supporting cap. Fig. 4 shows my two winged vane, the means for securing it to the vane frame, and the means for connecting it with the governing mechanism on the hub of the wind wheel. Fig. 5 is a cross section of the hub showing the governor closed when the wind wheel is full in the wind. Fig. 6 is same cross section showing the governor open when the wind wheel is out of the wind. Fig. 7 shows the slotted governor sleeve.

Similar figures refer to similar parts throughout the several views.

1 is the turn-table which supports the windmill. It is set on over the hollow cap 2, and both the turn-table and the cap are recessed, as shown by the dotted lines, and shown more particularly in cross-section in Fig. 3, to relieve the friction of the bearings.

3 are set screws to prevent the turntable from tilting in the wind. The cap is secured by the bolts 52 to the top plate of the pedestal 51, which in turn is secured by bolting to the bed plate 53. The bed plate is secured by bolts passing through near its foot, the lower end of which bolts are fastened to the posts of the wind mill, tower or other supporting timbers as may be convenient and necessary.

4 is the wind mill shaft having the crank 5, and carrying the hub or thimble 6 which is secured to and made to turn with it by the set screw $6^a$.

7 are threaded cups in the hub into which are screwed the inner ends of the arms 8 of the wind wheel, carrying the wings 9. The wings are set loosely on the arms a little to one side of the center, the arms being nearer the straight edge of the wing, and are held in position by the sections of the sheathing pipe 10. The wind wheel is dished as shown in Fig. 7 and is surrounded by a rim or band $10^a$ which is held in place by the nuts 11 on the threaded outer ends of the arms 8.

12 is the governor thimble carrying the spider 13 made fast to it by the set screw 16.

14 are pins set in the circumference of the spider and connected by the small rods 15 to the inner face near the inner ends, near the diagonal edge of the wind wheel wings.

17 are oppositely disposed pins set in and passing through the governor thimble and working in grooves 18 in the wind wheel thimble.

19 is the governor sleeve having the slots 20 parallel to its axis and the slots 21 diagonal thereto. Into the parallel slots 20 project the extending ends of the pins 22 set in the wind wheel thimble and into the diagonal slots project the inwardly extending ends of the pins 23 set in the governor thimble.

24 is the governor collar projecting over the governor thimble and secured to the governor sleeve by the set screws 26. In the groove 25 in the governor collar works the connecting collar 27 to which are attached the connecting rods 28 passing through the perforated ears 29 on the superior journal box 30 of the turn-table journals bearing the wind mill shaft, and are attached to the cross 46 on the governor rod 44. 31 is the vane consisting of the two inwardly curved wings 39 and 40. Between the wings is the toggle 43 secured thereto by the joints 42. The arms of the toggle are perforated to allow the wings to be opened or closed to any angle desired. The wings are hinged to the vane frame 32 by the hinges 41. The vane frame is provided with the extensions 33, 34 entering the bosses 35, 36, of the turntable and secured thereto by the set screws 37, 38. The governor rod 44 at its outer end is attached at the knee of the toggle and passing through the T 47 on the outer limb of the vane frame enters and works freely in the sleeve 45 and secured to the inner limb of the frame.

60 is a counterbalance hung on the curved arm 63 supported on the bar 61 attached to the upper arm of the vane frame, the lower end of the curved arm working between the brackets 62 on the governor rod.

48 is the pitman rod connected by ball joint with the connecting rod 56 connecting with the piston rod 58. The connecting rod is held true in position by double rows of four oppositely disposed set screws in the turntable pedestal 51, and numbered 50.

The peculiar construction of my pitman connection I believe to be new and reserve the right to cover and protect the same by other and further patents. I preferably use this connection though any of the usual connections between the shaft and the pump piston may be used.

The operation of my wind mill and self regulating vane governor is as follows: The wings 9 of the wind wheel are retained in working position with face to the wind by the rods 15 attached to the wings near the base and at the other end attached to the pins 14 in the spider 13, secured by the set screw 16 to the governor thimble 12 as shown in Fig. 5 with a given velocity of the wind, the wings will be thus held at a given angle to the axial line of the wind wheel, and the wings of the vane will stand at a certain angle to each other. An increase in the velocity of the wind will tend to produce an increase in the velocity of the rotation of the wind wheel. But an increase in the velocity of the wind gives an increased pressure on the wings of the vane causing them to approach each other. This decreases the angle of the toggle between the wings and carries the knee of the toggle in the direction away from the wind wheel. The governor rod 44 attached to the knee of the toggle is drawn in the same direction and by the rods 28 attached to the cross 46 and the collar 27 which works in the groove 25 in the governor collar draws the governor collar 24 along the line of the shaft away from the spider and the wind wheel. This governor collar 24 is made fast to the slotted governor sleeve 19 by the set screws 26 entering the receptacles 26ª therein and when drawn back by the governor rod draws with it in the same direction the slotted sleeve. In the slot 20 parallel with the axis of the sleeve the pins 22 set in the wind wheel thimble work, whence the slotted sleeve must be and is drawn in the direction parallel with the axis of the wind wheel thimble and of the shaft. In the slots 21 diagonal to the axis of the sleeve the pins 23 set in the governor thimble 12 work, and when the slotted sleeve is drawn as indicated in a direction parallel with its axis, the sides of the slots 21 pressing the pins 23 will cause the governor thimble to revolve on the wind wheel thimble which motion is allowed by the set screw 17 set in the governor thimble working in the groove 18 therein, the extent of revolution being limited by the extent of the movement of the toggle by the closing of the wings of the vane, and by the extent of the slot 21. This part revolution of the governor thimble carries with it the spider 13 and by the rods 15 fastened to the pins 14 and to the inner face of the wings of the wind wheel, open or turn the wings out of the wind. Thus by adjustment of the limbs of the toggle at a given velocity of the wind the wings of the wind wheel will be turned entirely out of the wind, and up to that point the revolutions of the wind wheel will be uniform and unaffected by any change in the velocity of the wind, regulated and governed by the variation in the angle of the wings of the vane. In a decrease in the velocity of the wind, under the decreased pressure the wings of the vane are easily adjusted or moved by the toggle and through the inertia of the governor thimble and the revolution of the wind wheel the slotted sleeve is drawn back and the wings of the wind wheel turned into the wind until an equilibrium is established between the pressure on the wings of the wind wheel and on the wings of the vane. This may be assisted by the counterbalance 60 on the curved arm 63 supported on the bar 61 attached at its upper end to the upper arm of the vane frame, the lower end of the curved arm working between the brackets 62 on the governor rod 44, the weight of the counterbalance tending to spread the wings of the vane and to set the wings of the wind wheel into the wind. I do not however, limit myself to the use of the counterbalance as the mill will work perfectly without it.

To throw the wind wheel out of the wind and stop the mill and control its action from the ground I fasten a wire in a perforated ear on the connecting collar 27, or in other suitable manner, and pass it over a pulley, set it on the arm of the turn-table and down through the turn-table and pedestal till it comes within reach of the person standing on the ground, when by pulling on the wire the sleeve 19 is drawn back and the wings of the wind wheel thrown out of the wind, and on releasing the wire the wings are brought into the wind as above described.

The principal advantages which I claim for my improved wind mill and self-regulating vane governor are:—First, the wind wheel being dished, heavy braces in front of the wheel are not needed to give it strength and stability to meet the wind. Second, from the peculiar construction of my wind wheel, when in motion in the wind a partial vacuum is created immediately behind or to leeward of the wheel generating a suction through the wheel which produces a greater force acting on the wheel than is due to the direct action of the wind and giving greater force with a smaller wheel and less wind than can be obtained by any other wheel. Third, with my vane having two curved wings of the peculiar construction described a sudden change in the direction of the wind, will produce no lurch or jar, as is an objectionable feature in the mills provided with the vanes now generally in use. Fourth, in sudden gusts of wind, or sudden changes in the velocity of the wind, the wings of the wind wheel are not subject to violent strain, the changed pressure of the wind on the vane wings acting instantly and easily through my peculiar governing mechanism to open or turn out of the wind the wings of the wind wheel and thus relieve the pressure. Fifth, the governor collar overlapping the other working parts of the governing mechanism protects the working parts from the rain and storm and from the action of the weather. The shape of the wheel and the position of the working parts to leeward of the wind-wheel also serves largely to protect them from storm and weather.

Having fully described my invention, what I claim, and desire to secure by Letters Patent, is—

1. In a windmill, the combination of the pedestal secured to a suitable support, a cap secured to the pedestal, a turn-table mounted on said cap, a wind-wheel mounted on a shaft having its journals in the turn-table, a governing mechanism carried by the thimble of the wind-wheel, consisting of a spider carried on and secured by a set screw to a thimble surrounding and held in position on the wind wheel thimble by a pin working in a groove therein, a sleeve having oppositely disposed parallel and diagonal slots, pins set in the windwheel thimble working in the parallel slots and pins set in the governor thimble working in the diagonal slots, a collar surrounding the sleeve and made fast thereto by set screws entering openings in the sleeve, and means for connecting the spider with the wings of the windwheel, a vane frame secured in bosses on the turn table, a vane having wings hinged to the vane-frame, a toggle carried by the wings of the vane, rods connecting the toggle to the governing mechanism on the wind-wheel thimble, substantially as shown and described.

2. In the windwheel of a windmill, wings or sails having a straight and a diagonal edge hung on a line parallel with the straight edge of the wing or sail and between the central or median line and the diagonal edge thereof to arms having threaded inner ends to be set in threaded openings in the hub of the windwheel, and threaded outer ends to receive nuts on the outside of the rim or band encircling the windwheel, and provided with sleeves between the wings and the hub and between the wings and the rim or band to retain the wings in place on the arms, the wings being provided with eyes near the inner end, near the diagonal edge to engage hooks or rods connecting the wings with the spider, of a governing mechanism carried on the windwheel thimble, to retain the wings in or turn them out of the wind, in the manner substantially as shown and described and for the purposes specified.

3. In a windmill, a tail vane consisting of a vane-frame secured by extensions of the frame entering and secured in bosses on the turn-table of the wind mill, two curved wings hinged to the vane-frame, the convex faces facing each other and each bearing the arm of a toggle, a governor rod attached to the knee of the toggle and passing through a T on the outer limb of the vane-frame, entering a sleeve attached to the inner limb of the frame, and bearing a cross-bar near the ends of which are attached rods which pass through perforated ears on the superior journal-box on the turn-table and are secured at opposite sides of the connecting collar working in a groove in the governor collar of the governing mechanism carried on the windwheel thimble, and a counterbalance carried on a curved arm supported on a bar attached to the upper arm of the vane-frame, the lower end of the curved arm working between brackets on the governor-rod, substantially as shown and described and for the purposes specified.

4. In a wind mill, a governing mechanism consisting of a spider carried on and secured by a set screw to a thimble surrounding and held in position on the wind-wheel thimble by a pin working in a groove therein, a sleeve having oppositely disposed parallel and diagonal slots, pins set in the wind wheel thimble working in the parallel slots and pins set in the governor thimble working in the diagonal slots, a collar surrounding the sleeve and made fast thereto by set screws entering receptacles in the sleeve, means for connecting the spider with the wings of the wind wheel, and means for connecting the collar with a toggle between the wings of the vane, substantially as shown and described.

5. In the governing mechanism of a windmill, a governor sleeve having oppositely disposed parallel slots and oppositely disposed diagonal slots adapted to receive set screws from a surrounding collar, in combination with a windwheel thimble encircled by the sleeve, a governor thimble partly encircling the sleeve and a governor collar extending over the governor thimble and surrounding the sleeve, pins in the windwheel thimble working in parallel slots of the sleeve and pins in the governor thimble working in the diagonal slots of the sleeve, and set screws in the governor collar entering openings in the sleeve, substantially as shown and described and for the purposes specified.

6. In a wind mill, a vane governor consisting of a vane having two wings hinged to a vane frame secured by extensions of the frame entering and secured in bosses on the turn-table of the mill, the inner convex face of each wing bearing the arm of a toggle, a governor rod attached at the knee of the toggle passing through a T on the outer limb of the vane frame and entering a sleeve attached to the inner limb of the frame, a thimble surrounding the wind wheel thimble and held in position thereon by set screws working in grooves in the wind wheel thimble, a spider set on the thimble and fixed thereon by set screws, pins in the perimeter of the spider, rods connecting the wings of the wind wheel with the pins on the spider, a sleeve having opposite parallel slots and opposite diagonal slots encircling the wind wheel thimble and partly encircled by the thimble, pins set in the wind wheel thimble working in the parallel slots of the sleeve and pins set in the thimble working in the diagonal slots of the sleeve, a collar surrounding the sleeve and extending over the thimble and secured to the sleeve by set screws entering receptacles therein, a connecting collar working in a groove in the collar, rods secured at opposite sides of the connecting collar and passing through perforated ears on the superior journal-box on the turn-table attached to the cross-bar carried by the governor rod, and a counterbalance carried on a curved arm supported on a bar attached to the upper arm of the vane frame, the lower end of the curved arm working between brackets on the governor rod, substantially as shown and described.

7. The combination with the turn-table and with the cap as shown and described supporting the turn-table, the turn-table and cap being recessed as shown to relieve the friction of the bearing parts and the turn-table provided with set bolts to prevent tilting in the wind, of the pedestal hollow as to its central portion having the double row of set bolts to retain the connecting-rod of the wind-mill true in position and a base-plate, substantially as shown and described and for the purposes specified.

TRUMAN D. COOK.

Witnesses:
J. R. SILVER,
H. E. HUGHES.